(12) United States Patent
Lewis

(10) Patent No.: US 8,539,342 B1
(45) Date of Patent: Sep. 17, 2013

(54) READ-ORDER INFERENCE VIA CONTENT SORTING

(75) Inventor: Paton J. Lewis, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 650 days.

(21) Appl. No.: 12/252,626

(22) Filed: Oct. 16, 2008

(51) Int. Cl.
*G06F 17/00* (2006.01)

(52) U.S. Cl.
USPC ............ 715/243; 715/249; 715/251; 715/252

(58) Field of Classification Search
USPC .................................. 715/249, 251, 252, 243
See application file for complete search history.

(56) References Cited

U.S. PATENT DOCUMENTS

| | | | | |
|---|---|---|---|---|
| 5,379,373 | A * | 1/1995 | Hayashi et al. | 715/235 |
| 7,290,006 | B2 * | 10/2007 | Xie et al. | 1/1 |
| 2004/0146199 | A1 * | 7/2004 | Berkner et al. | 382/176 |
| 2004/0148571 | A1 * | 7/2004 | Lue | 715/514 |
| 2006/0010375 | A1 * | 1/2006 | Salesin et al. | 715/517 |
| 2006/0061614 | A1 * | 3/2006 | Kodama et al. | 347/19 |
| 2006/0150092 | A1 * | 7/2006 | Atkins | 715/517 |
| 2006/0150096 | A1 * | 7/2006 | Thacker et al. | 715/525 |

* cited by examiner

*Primary Examiner* — Doug Hutton, Jr.
*Assistant Examiner* — Andrew McIntosh
(74) *Attorney, Agent, or Firm* — Kilpatrick Townsend & Stockton LLP

(57) ABSTRACT

The present disclosure includes a system for generating a presentation order from a document that has fixed presentation layout when rendered. Techniques include reconstructing structural information and logical ordering for fixed-layout documents. A document editor generates a presentation order, or a read order, for contents within a fixed-layout document. The document editor creates an initial sort order for areas of content within a document. The document editor then generates a presentation order based on graphical dimensions and graphical placement relationships among areas of content within a document. The resulting presentation order can be used to create a second document or second layout, or to add structural information to create reflowed or reflowable content.

25 Claims, 10 Drawing Sheets

250

TimesFax     Friday, May 28, 1993     3

UNITED STATES

Chilling Documents Recount Sailor's Murder

YOKOSUKA, Japan — Airman Apprentice Terry M. Helvey, an American sailor who had pled guilty to beating a homosexual shipmate to death last October, was sentenced here Thursday to life in prison, bringing to an end a case followed closely in the bitter debate over gays in the military.

But after a week of testimony that frequently depicted the victim's homosexuality as peripheral to the crime, the real drama Thursday came after the sentencing, when for the first time the Navy released documents that described the precise course of events leading up to the unusually savage killing of Radioman Allen R. Schindler just outside the Navy base at Sasebo, in southwestern Japan.

The documents spelled out how Mr. Helvey, 21, had stalked Mr. Schindler through a park one evening into a public toilet, then punched and kicked him furiously, without any provocation, at least in part because he hated homosexuals and had heard Mr. Schindler was gay.

The documents made for chilling reading, and raised troubling questions of whether hostile attitudes towards homosexuals were tolerated aboard Mr. Helvey's ship, the amphibious assault ship U.S.S. Belleau Wood.

By JAMES STERNGOL

AIDS Research Advance

Researchers have shown that a vaccine can prevent the heterosexual spread of an AIDS-like virus in monkeys. While experimental vaccines had been shown to give protection to monkeys, none had worked for this mode of transmission. Experts praised the new study, which is being published Thursday in the journal Science, but warned that it would take years of additional research to develop a human AIDS vaccine, if one can be devised.

"What makes this important is that it addresses the primary mode of H.I.V. transmission," said Dr. Shiu-Lok Hu, a virologist at the University of Washington.

Briefly Noted

Stein Pulls Out of Mayoral Race

City Council President Andrew J. Stein withdrew from the New York City mayoral race Thursday to run for re-election instead, leaving Mayor David N. Dinkins a clear path to the Democratic nomination and instantly reshaping the fight for City Hall into a five-month duel between the Mayor and his Republican-Liberal challenger, Rudolph W. Giuliani.

Mr. Stein, who has trailed the Mayor badly in all the polls for months, said in an interview that he was abandoning his effort at the urging "of so many people whom I respect" — including Governor Mario M. Cuomo — who told him that the Democrats needed to put all their focus on beating Mr. Giuliani in November.

Health Care Coverage for Abortion

WASHINGTON — A coalition of 84 organizations — including labor unions, civil rights groups and a variety of supporters of abortion rights — began a campaign Thursday to push for coverage of abortion services in any national health care package.

The announcement came as President Clinton gave a tepid statement on the issue in a televised town hall meeting. "I don't think a decision has been made about that," Mr. Clinton said, although he went on to say the health care task force would try to insure that "we shouldn't take away from people some right they now have in their health insurance plans."

Mrs. Clinton's Speech Alarms AMA

WASHINGTON — Declaring that the President "may need us more than we need him," a top official of the American Medical Association Thursday rejected charges of price gouging and said Hillary Rodham Clinton had grossly oversimplified the problems of the health-care system.

Leaders of the association said they were alarmed and dismayed at Mrs. Clinton's attacks on the health-care industry in a speech on Wednesday.

While she did not identify any offenders, she denounced special interests and said that "too many people have made too much money" providing health care and health insurance.

*The Build-More-Prisons Solution Has Lost Steam*

TAMPA, Florida — After more than a decade of tougher sentences and costly prison construction that still cannot cope with the largest convict population in American history, hundreds of frustrated criminal justice specialists gathered here expectantly this week to heed Governor Lawton Chiles's call for fostering alternatives to prison.

Instead, they found a Governor uncertain how to deal with a deepening prison crisis that faces not just Florida but most other states. Or rather they did not find Mr. Chiles at all: he ended up skipping the conference because he was calling an emergency legislative session to seek fresh taxes for adding at least 21,000 spaces to the jammed Florida prison system.

Conferees at the unusual meeting of 700 judges, lawmakers and corrections officials could not have asked for a timelier example of how the prison issue is shifting. From the go-go years of the crackdown on crime in the 1970's and 1980's, when states imposed tougher sentences and had plenty of money to build more prisons, politicians are now finding themselves with ever more difficult choices.

In the face of an overcrowding crisis, Governor Chiles is seeking to build more prisons despite Florida's strained budget. But this lock-them-up option is no longer entirely popular as politicians try to manage prison-heavy budgets and growing public impatience with crowding and its consequences.

"Since 1971 we have embarked on the largest social experiment in punishment in the history of the world," Todd R. Clear, a Rutgers University criminal justice scholar, told the conference here. But though the rate of imprisonment has more than quadrupled in that time, he went on, it has produced no appreciable drop in the crime rate. "The get-tough movement has made punishment the only growth industry in government today," said Mr. Clear. And others at the gathering agreed that a certain disgust with the consequences of prison mega-building may be dawning in the nation as education and other governmental responsibilities take second place to corrections.

By FRANCIS X. CLINES

| P-1 | P-2 | Friday, P-3 8, 1993 | P-4 |

UNITE P-6 TATES    P-5

Chilling Documents P-7 unt Sailor's Murder

YOKOSUKA, Japan — Airman Apprentice Terry M. Helvey, an American sailor who had P-9 lty to beating a homosexual ship P-9 eath last October, was sentenced P-9 rsday to life in prison, bringing to an end a case followed closely in the bitter debate over gays in the military.

But after a week of testimony that frequently depicted the victim's homosexuality as peripheral to the crime, the real drama P-13 t time the Navy released docun P-13 described the precise course of events leading up to the unusually savage killing of Radioman Allen R. Schindler just outside the Navy base at The documents spelled out how Mr. Helvey, 21, had stalked Mr. Schindler through a park P-16 ng into a public toilet, then p P-16 d kicked him furiously, without any provocation, at least in part because he hated homosexuals and had heard Mr. Schindler was gay.

The documents P-20 illing reading, and raised troubling questions of whether hos P-10 des towards homosexuals P-10 ed aboard Mr. Helvey's ship, the amphibious assault By JA P-12 NCOL

AIDS Res P-14 Advance

Researchers have shown that a vaccine can prevent the heterosexual spread of an AIDS-like virus in monkeys. While experimental vaccines had been shown to give protection to monkeys, none had worked for thi P-17 transmission. Experts praised P-17 tudy, which is being published Thursday in the journal Science, but warned that it would take years of additional research to develop a human AIDS vaccine, if one can be "What makes this important is that it addresses the P-21 ode of H.I.V. transmission," P-21 iu-Lok Hu, a virologist at niversity of Washington.

Brie P-8 oted

Stein Pulls P-11 yoral Race

City Council President Andrew J. Stein withdrew from the New York City mayoral race Thursday to run for reelection instead P-15 layor David N. Dinkins a clea P-15 he Democratic nomination an reshaping the fight for City Hall into a five-month duel between the Mayor and his Republican challenger, Rudolph W. Giuliani.

Mr. Stein, who has trailed the Mayor badly in all the polls for months, said in an interview that he was abandoning his effort at the u P-18 many people whom I respect P-18 ding Governor Mario M. Cuomo — who told him that the Democrats needed to put all their focus on beating Mr. Giuliani in November.

Health Care P-19 for Abortion

WASHINGTON — A coalition of 84 organizations — including labor unions, civil rights g P-22 a variety of supporters of P-22 hts — began a campaign Thu push for coverage of abortion services in any national health care package.

The announcement came as President Clinton gave a tepid statement on the issue in a televised town hall meeting. "I don't think a decision has been made about that," M P-26 id, although he went on to say P-26 care task force would try to insure that "we shouldn't take away from people some right they now have in their health insurance plans."

*The Build-More-Pris* P-23 *ution Has Lost Steam*

TAMPA, Florida — After more than a decade of tougher sentences and costly prison construction that still cannot cope with the large P-24 population in American histo P-24 ls of frustrated criminal justice specialists gathered here expectantly this week to heed Governor Lawton Chiles's call for fostering alternatives to prison.

Instead, they found a Governor uncertain how to deal with a deepening prison crisis that faces not just Florida but most other states. Or rather they did not find Mr. Chil P-27 he ended up skipping the c P-27 ecause he was calling an emergency legislative session to seek fresh taxes for adding at least 21,000 spaces to the jammed Florida prison system.

Conferees at the unusual meeting of 700 judges, lawmakers and corrections officials could not have asked for a timelier example of how the prison issue is shifting. From the go-go P-31 c crackdown on crime in the 1980's, when states imposed tougher sentences and had plenty of money to build more prisons, politicians are now finding themselves with ever more difficult choices.

In the face of an overcrowding crisis Governor Chiles is seeking to build more prisons despite P-25 trained budget. But this lock-t P-25 on is no longer entirely popular as politicians try to manage prison-heavy budgets and growing public impatience with crowding and its consequences.

"Since 1977 we have embarked on the largest social experiment in punishment in the history of the world," Todd R. Clear, a Rutgers University criminal justice scholar, told the conference here. But though the rate of imprisonment has more than quadrupled in that time, he went on, it has produced P-28 able drop in the crime rate. "Th P-28 movement has made punish only growth industry in government today," said Mr. Clear. And others at the gathering agreed that a certain disgust with the consequences of prison mega-building may be dawning in the nation as education and other governmental responsibilities take second place to corrections.

By FR P-33 LINES

Mrs. Clinton P-29 larms AMA

WASHINGTON — Declaring that the President "may need us more than we need him," a top official of the American Medical Asso P-30 ursday rejected charges of pric P-30 nd said Hillary Rodham Clinton had grossly oversimplified the problems of the health care system.

Leaders of the association said they were alarmed P-32 ayed at Mrs. Clinton's atta P-32 e health-care industry in a speech on Wednesday.

While she did not identify any offenders, she denounced P-34 erests and said that "too mar P-34 ave made too much money" health care and health insurance.

*FIG. 3*

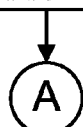
FIG. 5

READ-ORDER INFERENCE VIA CONTENT SORTING

BACKGROUND

There are many different conventional electronic file or data formats used for creation and storing of content within electronic documents. Different formats have various advantages and disadvantages. In general, however, electronic file formats for documents can be grouped into two types of formats: (1) formats that maintain structural information about document content, and (2) formats having a fixed-layout or fixed presentation for document content.

Formats that maintain structural information about document content are useful in that such formats can be easily edited. For example, two popular formats of this type include "Word documents" (.DOC filename extension) and Hypertext Markup Language (HTML) documents. Word documents are useful for word processing. The Word document file or data format maintains structural information. The structure of a document is a description of how the low-level content of the document (glyphs, lines, images, etc) are grouped together into higher-level conceptual objects (paragraphs, headings, headers, columns, articles, etc), and the manner in which these higher-level objects are organized in a hierarchy. HTML documents are similar and include structural information such as start and stop locations of paragraphs, start and stop locations of headings, section breaks, information about titles and headers, information for constructing tables, and so forth. One advantage of data formats that maintain structural information of content within a document is that the content (text, images, tables, etc.) within the document can be easily reflowed when rendered in different manners. Reflowing is a process that enables a rendered document (e.g. displayed on a display of a computer system) to be resized and reshaped into a new form factor by software processing in order to be displayed in a different sized display area. The reflow process can be applied to printed documents as well. Reflowing text, for example, in an HTML document is simple because the HTML document does not indicate how wide text should be on a screen. A user viewing an HTML document in a web browser can resize the browser by narrowing a width of a browser window, and the result is that content within the HTML document automatically adjusts to the new window size. Because of the available structural information in an HTML document, a resized browser can wrap text to fit within a narrowed window size. In the context of a printed document, reflowing allows the same content to be printed on different sized print media (e.g. legal sized paper, A1, A2, etc.) and the reflow processing will enable the printed content to be resized or repositioned (reflowed) to fit the new paper size.

Conventional formats having or defining a fixed-layout or fixed presentation for document contents are useful for maintaining a layout designed by an author. This means that a fixed-layout document layout appears the same regardless of what processor, hardware, operating system, or printer generates the document and does not take into account available display area or paper size. Fixed-layout documents have a history that originates from the print world. Such documents essentially describe exactly where ink goes on a page. For example, such fixed-layout formats instruct a printer or display screen exactly where on the page to draw the letter "C," or where to draw the letter "H," or where to draw a line, or where to draw a curve.

A common and popular example of a fixed-layout file format is the Portable Document Format (PDF). PDF is a file format created by Adobe Systems, Inc. of San Jose, Calif., U.S.A. The PDF document format enables representing two-dimensional documents in a manner independent of application software, hardware, and operating system. PDF is an open standard that was officially published on Jul. 1, 2008 by the International Organization for Standardization (ISO) as ISO 32000-1:2008.

SUMMARY

As discussed above, word processing documents, or documents that have data formats that maintain structural information about document content allow for ease in editing and reflowing of content portions of such documents. There are, however, several disadvantages with such formats. One disadvantage relates to disseminating copies of documents. Recipients need compatible software and hardware to properly view the documents. Different versions of software can render such documents improperly, such as using an incorrect font, or spacing lines of text incorrectly and the ability to easily reflow the content of such document does not ensure uniform presentation. Thus, many authors choose formats having a fixed-layout or fixed presentation for document content such as the PDF-type format to create documents because such formats enable rendering the layout of content portions within the documents exactly as the author intended. That is, PDF-type formats provide a fixed graphical presentation for the layout of the content portions in the document and do not enable reflow.

The PDF type of format is now very common as a Web document for publishing content. Web users operating a personal computer with a conventional desktop display screen can easily view PDF documents. However, viewing PDF or other fixed layout documents with a small screen device can be challenging. Many Web users accessing PDF documents using a mobile phone, personal digital assistant (PDA), or other small-screen device, find it difficult to view and read content within a PDF document. One common PDF document size is 8.5 inches by 11 inches. Because the PDF file is a fixed-layout format, an 8.5 inch by 11 inch document is not easily viewable on a small screen. For example, a mobile phone screen might be 2 inches by 3 inches. One such a screen, a user resizing the document to completely fit within the small screen will find text within the document to be unreadable. To read such a document on a small screen, the user must pan, zoom, and scroll across the document in an attempt to read the document contents. Such document manipulation is time-consuming and frustrating to the user of a small-screen computing device.

One challenge of the PDF-type format is that structural information about what constitutes a word, or a heading, or paragraph, or a figure, is lost when creating a PDF file. In other words, the PDF file does not include instructions that identify that, for example, a certain group of characters constitute a paragraph, or title, or a heading, or sentence, or a figure. There exists a concept called tagged PDF documents with which authors can tag content within a PDF document to indicate which drawing commands form a paragraph, and the order in which those paragraphs should be read. Unfortunately, such tagging is not widely accepted, and largely ignored. Furthermore, tagging that exists is not very usable for reconstructing complete structural information. The vast majority of PDF files are not tagged, and thus there is a need to re-create structural information for such files.

A PDF file is represented by a long list of drawing commands. This list is sometimes called a "display list." Display lists do not follow a uniform pattern or organizational structure. There are many different drivers and programs for generating PDF documents, and so it follows that different PDF documents can have different display list orders depending on decisions of programmers of the different drivers.

With a lack of order to the list of drawing commands, it is challenging to reconstruct structural information. For example, a PDF document might have two columns of text. The display list for this PDF document might order drawing commands from left to right on the page, and then from top to bottom. Thus one drawing command might instruct a processor to draw characters across one line of the page, and this line includes text from two different paragraphs. In other words, drawing commands for a single paragraph might not grouped together.

Therefore, one challenge is to reconstruct high-level structural information from a random list of drawing commands.

Techniques discussed herein may significantly overcome the challenge of reconstructing structural information from a document having a fixed presentation layout. For example, as will be discussed further, certain specific embodiments herein are directed to a document editor for generating a presentation order, or a read order, for contents within a fixed-layout document. Techniques discussed herein extract structural information from a list of drawing commands of a document to be able to present the document to a viewer in a different layout or in a reflowed view.

An example advantage of techniques disclosed herein is that a user can readably view a PDF document on a small screen, such as on a mobile phone, without needing to pan and zoom, or without needing to scroll in multiple directions. Another example advantage is extracting structural information from drawing commands to create content that can be reformatted or reflowed to fit on a small screen such as on a PDA. Instead of having to pan and zoom, content can be presented in a vertical, readable layout that can be easily viewed by scrolling in one direction.

In operation, a document editor receives, or accesses, a document that defines a first layout. The first layout specifies a fixed placement for rendering of content portions contained within the document. The fixed placement describes or dictates a fixed graphical layout for where on a page, or display, those content portions are to appear within the document when those content portions are rendered. By way of a non-limiting example, the first layout is encoded in the data format of the document and describes the location or coordinates of content on a page, such as where the letter "T" should appear. Content portions refer to a subset of content or group of content or group of drawing commands that can be identified as an individual or logically separable entity. For example, content portions can refer to sentences, paragraphs, titles, vector graphics, raster graphics, headings, section lines, etc.

The document editor then analyzes the first layout to determine a presentation order for the content portions. The presentation order allows placement of the content portions in a second layout. The second layout is different than the fixed graphical placement specified by the first layout and, maintains structural relations between the content portions. By way of a nonlimiting example, the second layout can allow placement of the content portions in a layout that is narrower or wider than the first layout. The document editor then provides the presentation order of the content portions to any requesting device or client.

In one embodiment, the document that the document editor receives is a PDF document that defines or has a fixed arrangement for individually identifiable content portions within the PDF document. In analyzing the first layout to determine a presentation order, the document editor executes a two-step process.

In the first step, the document editor defines a sort order for content portions in the first layout based on placement relationships of the content portions. The document editor identifies placement relationships between content portions in the first layout. Placement relationships include graphical placement information. For example, the document editor considers maximum and minimum dimensions of each content portion, where each content portion is positioned in the document relative to the document itself and relative to other content portions. The sort order can be an initial, numerical ordering of content portions in the document. The document editor analyzes content portions along two dimensions to determine the sort order. For example, the document editor analyzes content portions along an X-axis and along a Y-axis.

In the second step, the document editor generates a presentation order, or a read order, by iterating through the content portions according to the initial, numerical sort order, and by analyzing graphical dimensions and placement of the content portions in the document. The presentation order that the document editor generates can be used to maintain structural information between those content portions. Such structural information can include, for example, sentence and paragraph identification and read sequence, title identification, figure identification, and a read order. Read order refers to a sequence of content portions that a person, viewing a document as a whole, would logically follow, such as a read order of paragraphs in a multi-column document. In creating the presentation order, the document editor can use a binary tree or sorted list for ordering content portions. Content portions are added to the tree in the sequence of their sort order. Logic that performs the addition of content portions determines placement of each content portion in a specific branch of the tree or list.

In another embodiment, the document editor analyzes drawing commands. The drawing commands describe the presentation of content for a two-dimensional document (either displayed or printed in hard copy). This presentation of content has a fixed, graphical layout. For example, the document editor analyzes a display list from a PDF document. The document editor identifies content portions from the display list drawing commands. Each content portion has graphical dimensions and a two-dimensional graphical location in the document.

The document editor analyzes and sorts the content portions by comparing relative graphical locations for the content portions with graphical dimensions of the content portions. This produces the sort order. Conceptually, each content portion in the document can be visualized as a rectangular enclosure surrounding the content portion. Such a rectangular enclosure can have a width, a height, a center point, or other two-dimensional graphical identifications. As a specific example, the analysis process can define virtual bounding boxes around paragraphs of text during the sort order processing.

The document editor creates a content sort order by numbering the content portions based on analyzing location and dimensions of content portions along two dimensions (e.g. horizontal and vertical placement relationships between content portions). The document editor creates a binary tree for generating a read order by sequentially iterating and inserting, according to the sort order, the content portions on (i.e. into) the binary tree by comparing relative graphical locations of the content portions with graphical dimensions of the content portions. The document editor can then generate a presentation order of content portions by executing inorder traversal of the binary tree. During this process, the document editor can add structural data to the content portions to create a presentation order having reflowable content.

In addition to the example method, system, etc., embodiments as discussed above, and other embodiments herein, can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include a document editor and/or related functions as explained herein to carry out different embodiments as described herein.

Yet other embodiments herein include software programs to perform the steps and operations summarized above and disclosed in detail below. One such embodiment comprises a computer program product that has a computer-storage medium (e.g., a tangible computer readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as inferring presentation orders from fixed-layout documents. The instructions, and method as described herein, when carried out by a processor of a respective computer device, cause the processor to perform the methods disclosed herein.

Another particular embodiment of the present disclosure is directed to a computer program product that includes a computer readable medium having instructions stored thereon for supporting operations such as inferring a read order and extracting structural information from a fixed-layout document. Such instructions, and thus methods as described herein, when carried out by a processor of a respective computer device, cause the processor to operate as explained in accordance with the processing described herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, and apparatuses herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting document editor applications such as document processing, editing, and viewing and rendering and reformatting programs. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 2 is an example diagram of a document layout having fixed placement.

FIG. 3 is an example diagram illustrating a conceptual identification of content portions in a sort order according to embodiments herein.

FIGS. 5 and 6 is a diagram of a mobile device displaying a second layout of content both in a mobile device and with the content displayed in an expanded vertical view according to embodiments herein.

DETAILED DESCRIPTION

According to one example embodiment, a document processing program such as a document editor receives a document that defines a first layout. The first layout specifies a fixed graphical placement for presentation or rendering of content portions contained within the document. That is, the first layout defines a fixed non-reflowable presentation format for content portions in the document. An example would be to receive a PDF document that has content portions such as pictures or text paragraphs. The PDF document does not contain structural information (or does not contain usable structural information) to allow or provide for the ability to reflow the content portions to accommodate different display formats, such as different sized display screens or different sized printed paper output. The document editor analyzes the first layout to determine a presentation order for the content portions. In analyzing the first layout, the document editor identifies and sorts the content portions along two dimensions and assigns a sort order number to each content portion. Then the document editor iterates over the sorted list of content portions to determine a read order of the content portions. The read order is then traversed to identify the presentation order for the content portions. This presentation order allows placement or rendering of the content portions in a second layout that is different than the fixed placement specified by the first layout and that maintains structural relationships between the content portions. The document editor can then provide this presentation order of the content portions for display or other rendering (e.g. printing) in accordance with the second layout.

Figure 1:
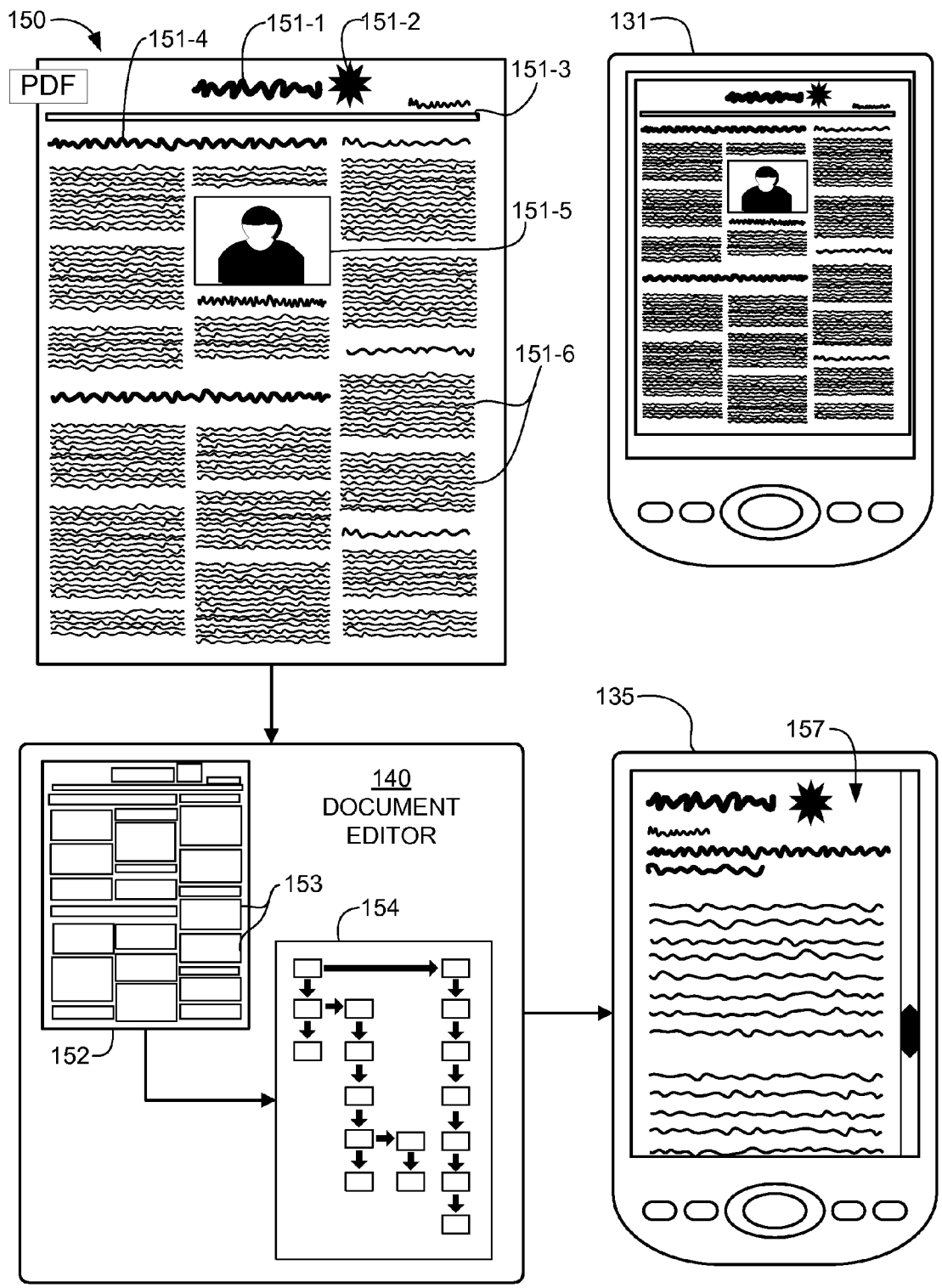
FIG. 1 is an example diagram of a document editor for processing of content in a computer/network environment according to embodiments herein.

Now, more specifically, FIG. 1 is an example diagram of a document editor for processing content within a document according to embodiments herein. The document editor 140 receives document 150. The document 150 is a representation of a document that defines a first layout having fixed placement for presentation and content portions. In other words, a first layout is a display or print layout that when rendered has content portions that are fixed graphically relative to each other. The document editor 140 configured as explained herein is able to process this fixed layout document 150 in a manner that allows the content portions to be identified and processed into a presentation order that enables those content portions to be repositioned or reflowed to accommodate different display configurations. As an example, if the document 150 is a PDF document, the system disclosed herein provides the ability to reflow content portions for presentation, for example, on a device such as a PDA with a small display that would not otherwise accommodate display of the fixed layout PDF document. The presentation order for the content portions produced by the approaches described herein maintains the structural relations between those content portions to maintain readability for a person viewing the presentation order on the small display device.

Within document 150, there is title 151-1, logo 151-2, heading divider 151-3, headline 151-4, image 151-5, and example paragraphs 151-6. All of these comprise content portions 153. For example, content portions can include any of words, sentences, paragraphs, images, lines, and so forth. Content portions in document 150 are graphically fixed in that titles and paragraphs will always appear in their respective, displayed locations as depicted in document 150. For example, FIG. 1 depicts a document 150 having three columns. If document 150 were resized, by computing device 131, to fit on a smaller screen, there would still be three columns of content. Depending on the size of the smaller screen, the document would be non-readable because the resized text is too small. Device 131 illustrates document 150 resized on a smaller screen showing content from document 150 as too small to easily read.

The document editor 140 receives the document 150 as a set of drawing commands. That is, the data within the document defines drawing commands that define content portions and where those content portions are to be displayed in the fixed or fixed presentation. The drawing commands can be a list of drawing instructions having no apparent order. In some cases, such drawing commands can be spread around inside document 150 in a seemingly random order. For example, in a PDF document there are "text show" commands. Several text show commands comprise a paragraph. These commands, however, might be spread out or scattered throughout the PDF document instead of grouped together in the display list. However, when the drawing commands are rendered (e.g. by a PDF viewer), the result is a fixed layout presentation of content portions in specific graphical locations relative to each other.

For example, in a three-column document, the order of text show commands may instruct a display device to generate letters and words going left to right across one line of the page before generating the next line. With such a drawing command structure, the display list might be sequenced to draw column 1, line 1, then column 2, line 2, then column 3, line 1, then column 1, line 2, and so on.

Document 250 in FIG. 2 illustrates an example document having legible content. The literal text content itself within example document 250 is not important to make and use the present system, but such legible content is useful to visualize the document editing and processing process disclosed herein that allows the fixed layout document to be reflowed for presentation of content portions in a second layout that is not fixed, but that maintains the structural information between the content portions as was apparent in the first fixed layout.

Document editor 140 executes a processing step to organize drawing commands into content portions such as paragraphs or blocks of text to generate a sort order 152. Document editor 140 can use any optical object recognition or graphical recognition process, or drawing command analysis process to group content into content portions 153. Such organization of content portions identifies, for example, when a string belongs to a line, when a line belongs to a paragraph, when Bezier curves belong to a graphic image, etc.

In FIG. 1, sort order 152 is illustrated as a document having several content portions 153. FIG. 3 shows content portions from document 250 outlined with rectangles which are bounding boxes 353. Bounding boxes 353 bound or cover a graphical area that encompasses a content portion. Bounding boxes 353 are conceptual and thus are not necessary for executing the document editing process. Nevertheless, bounding boxes 353 are useful for understanding how to process a fixed layout document 250. The underlying data structure used to represent a sorted list of content portions is not important. The data structure could be an array, a list, a tree, or any other data structure.

In FIG. 3, sort order 352 is illustrated with legible content. Bounding boxes 353 conceptually illustrate how document editor 140 identifies content portions to create a numbered sort order 352. Each bounding box 353 is numbered. Numbering of bounding boxes 353 begins generally from the top left of document 250 and numbers boxes from left to right and then from top to bottom. This illustrates X-Y sorting. That is, sorting along two dimensions or axes to determine a numerical ordering.

The following is example code that document editor 140 uses to construct sort order tree 352 and corresponding numerical order. In the example code, document editor 140 follows a process of inferring a sort order:

```
/* template parameter real_type is useful to support both
floating point builds as well as mobile environments that only
support fixed point real numbers. */
template <typename real_type>
class ContentPortion
{
public:
    /* Recursively add a content portion to the content portion
    sort order tree. Add content portion prior to building the
    content portion presentation order tree. 'epsilon' is the
    tolerance allowed when determining if content portions are at
    roughly the same Y position: */
    void AddToSortOrderTree( ContentPortion * that, const
real_type epsilon )
    {
        if( that->m_boundingBox.GetMinY( ) >
m_boundingBox.GetMaxY( ) - epsilon )
        {
            AddToSortOrderTree( m_prev, that, epsilon );
            return;
        }
        if( that ->m_boundingBox.GetMaxY( ) - epsilon <
m_boundingBox.GetMinY( ) )
        {
            AddToSortOrderTree( m_next, that, epsilon );
            return;
        }
        /* The content portions overlap vertically. Identify
    if the content portions are in distinct columns:*/
        if( that->m_boundingBox.GetMaxX( ) - epsilon <
m_boundingBox.GetMinX( ) )
        {
            AddToSortOrderTree( m_prev, that, epsilon );
            return;
        }
        if( that->m_boundingBox.GetMinX( ) >
m_boundingBox.GetMaxX( ) - epsilon )
        {
            AddToSortOrderTree( m_next, that, epsilon );
            return;
        }
        /* If there is overlap above a specific tolerance,
    determine which content portion is smaller. If the smaller
    content portion is in the upper-left diagonal half of the larger
    content portion, the smaller content portion is numbered first in
    presentation order. Avoid the possibility of overflow for the
    sake of fixed point builds. If 'b' is the upper-right-hand corner
    of the larger bounding box and 'a' is the lower-left-hand corner,
    and 'p' is the center point of the smaller bounding box, then
    calculate cross(normalize(b-a),(p-a)) in order to determine the
    side of the diagonal for the centerpoint of the smaller bounding
    box: */
        const real_type scale = std::MMax(
m_boundingBox.Length( ),
            m_boundingBox.Width( ),
            that->m_boundingBox.Length( ),
            that->m_boundingBox.Width( ) );
        const real_type thisArea = ( m_boundingBox.Length( ) /
scale ) *
m_boundingBox.Width( )          / scale );
        const real_type thatArea = (
that->m boundingBox.Length( )   / scale ) *
                                                ( that-
>m_boundingBox.Width( )         / scale );
        BoundingBox<real_type> largerBoundingBox =
m_boundingBox;
        BoundingBox<real_type> smallerBoundingBox = that-
>m_boundingBox;
        if( thisArea < thatArea )
            std::swap( largerBoundingBox,
smallerBoundingBox );
        real_type xBasis = largerBoundingBox.Length( );
        real_type yBasis = largerBoundingBox.Width( );
        real_services::ScaleVectorLengthToNearOneIfDotCanOverflowOr
Underflow( &xBasis, &yBasis );
        const real_type result =
real_services::CrossForSignOnly(
            xBasis, yBasis,
            smallerBoundingBox.GetMinX( ) / 2 +
smallerBoundingBox.GetMaxX( ) / 2 - largerBoundingBox.GetMinX( ),
            smallerBoundingBox.GetMinY( ) / 2 +
smallerBoundingBox.GetMaxY( ) / 2 - largerBoundingBox.GetMinY( ) );
        if( ( thisArea < thatArea && result > 0 ) ||
            ( thisArea >= thatArea && result <= 0 ) )
            AddToSortOrderTree( m_next, that, epsilon );
        else
            AddToSortOrderTree( m_prev, that, epsilon );
    }
    /* Call this method once only if possible, on the root of
the sort order tree:*/
    void DetermineReadOrder( void )
    {
        ContentPortion<app_traits> * firstContentPortion = 0;
        DetermineReadOrder( firstContentPortion );
    }
protected:
    BoundingBox<real_type> m_boundingBox;
private:
    void AddToSortOrderTree( ContentPortion * & link,
ContentPortion * that, const real_type epsilon )
    {
        if( link )
            link->AddToSortOrderTree( that, epsilon );
        else
            link = that;
    }
    /* Recursively build the presentation order tree. First
generate content portion in presentation order. On the initial
call to this method from the sort order tree root node,
firstContentPortion should be null:*/
    void DetermineReadOrder( ContentPortion<app_traits> * &
firstContentPortion )
    {
        if( m_prev )
            m_prev->DetermineReadOrder( firstContentPortion
);

if( !firstContentPortion )
            firstContentPortion = this;
        else
            firstContentPortion->AddToReadOrderTree( this
);

if( m_next )
            m_next->DetermineReadOrder( firstContentPortion
);
    }
    void AddToReadOrderTree( Content portion * that )
    {
        if( m_columnIsClosed )
            AddToReadOrderTree( m_right, that );
        else
        {
            if( m_rightEdges.GetCount( ) == 0 )
                m_rightEdges.Add(
GetBoundingBox( ).GetMaxX( ) );
            /* If that content portion starts to the right
of the content portions in this column, put that content portion
in the column on the right:*/
            const real_type thatLeftEdge =
that->GetBoundingBox( ).GetMinX( );
            if( thatLeftEdge > GetBoundingBox( ).GetMaxX( )
                && ( !m_below || thatLeftEdge >
m_below->GetBoundingBox( ).GetMaxX( ) )
                && thatLeftEdge > m_rightEdges.GetAvg( ) )
                AddToReadOrderTree( m_right, that );
        /* If content portion horizontally covers both current column and
the column to the right, then close the column below this content
portion:*/
            else if( m_right &&
that->GetBoundingBox( ).GetMaxX( ) >
                    m_right->GetBoundingBox( ).GetMinX( ) )
            {
                m_columnIsClosed = true;
                AddToReadOrderTree( m_right, that );
            }
            else
            {
                AddToReadOrderTree( m_below, that );
                m_rightEdges.Add(
that->GetBoundingBox( ).GetMaxX( ) );
            }
```

```
        }
    }
    void AddToReadOrderTree( Content portion * & link, Content
portion * that )
    {
        if( link )
            link->AddToReadOrderTree( that );
        else
            link = that;
    }
    Content portion * m_prev;
    Content portion * m_next;
    Content portion * m_right;
    Content portion * m_below;
    SequenceStats<real_type> m_rightEdges;
    bool m_columnIsClosed;     /* If true, do not insert below any
more
};   */ class Content portion
```

The second step of the system is to generate a presentation order from the sort order.

Figure 4:
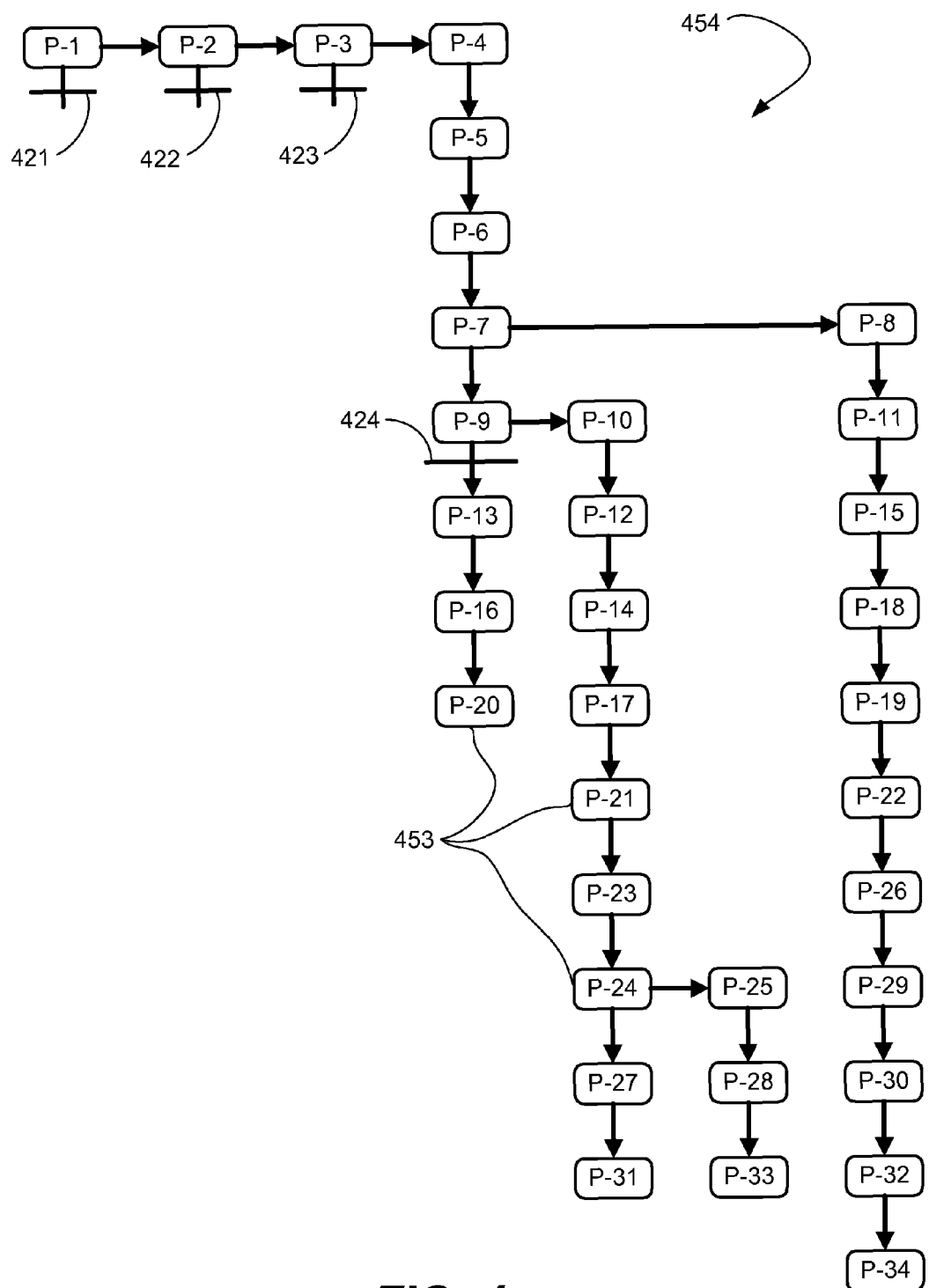
FIG. 4 is an example presentation order tree for content portions of a document according to embodiments herein.

Upon completing the sort order tree 352, document editor 140 begins constructing presentation order tree 454 as illustrated in FIG. 4. In FIG. 4, nodes 453 correspond to bounding boxes 353 of FIG. 3, with each node having an identical number to a number in a corresponding bounding box. Presentation order tree 454 is embodied as a binary tree having down branches (instead of left branches) and right branches. Having branches drawn in vertical dimensions and horizontal dimensions—instead of diagonal dimensions—is useful to conceptualize the graphical analysis that document editor 140 executes. In this example, document editor 140 represents the presentation order tree as a binary tree, but such representation is not required. Document editor 140 can use any organizational structure, such as a sorted list.

The graphical analysis correlates to relative physical dimensions of content portions on a printed page. The sort order tree 352 maintains bounding box information for each content portion. This includes coordinates for each bounding box or content portion rectangle. Document editor 140 can examine bounding box coordinates of any content portion to identify whether a given bounding box is above, below, to the right of, to the left of, or overlapping another bounding box.

The analysis of sort order tree 352 by document editor 140 analyzes bounding boxes 153 beginning at the top of the page and continuing to bottom of the page. Alternatively, document editor 140 first analyzes the most upper and the most lower content portions to determine any headers or footers, which document editor 140 can then extract separately.

Document editor 140 creates presentation order tree 454 by recursively inserting nodes into a binary tree. Document editor 140 begins with bounding box P-1 designated as the root node P-1. Consider that bounding box P-1 covers a content portion that comprises a vector art or vector graphics entity. Document editor 140 identifies areas in document 250 having a series of commands to draw vector art, and groups together such commands as a single content portion.

Next in sequence is bounding box P-2. Bounding box P-2 is positioned to the right of bounding box P-1, and so document editor 140 places node P-2 to the right of node P-1. Next in sequence is bounding box P-3. Beginning at the root node P-1, document editor 140 identifies that bounding box P-3 is positioned to the right of bounding box P-1, and to the right of bounding box P-2. Thus document editor 140 places node P-3 in the right branch of node P-2. A similar analysis of bounding box P-4 places node P-4 as the right branch of node P-3.

Next is bounding box P-5. Bounding box P-5 covers two horizontal lines used to set off headings in document 250. Document editor 140 treats bounding box P-5 as one content portion. In a display list for document 250, drawing commands for both these horizontal lines might appear adjacent in the display list. In this case, document editor 140 can group these horizontal lines as one content portion encompassed by bounding box P-5. The top edge of bounding box P-5 extends above the top edge of bounding box P-6. Graphically analyzing sort order 352, document editor 140 identifies that bounding box P-5 extends across the entire page, and extends below all of bounding boxes P-1, P-2, P-3, and P-4. Because of this extension, node P-5 becomes the down branch of node P-4, but causes branch closures 421, 422, and 423 under nodes P-1, P-2, and P-3. These branch closures, in effect, create a section break in the presentation order tree 454 similar to how content within bounding box P-5 separates heading information in the document 250. With closures 421, 422, and 423, all subsequent bounding boxes 353 move directly from the root node P-1 to node P-4 to be compared with P-4 to determine a down or right branch.

If document editor 140 identifies that a bounding box for a content portion comprising vector art overlaps or encompasses a bounding box containing text, then document editor 140 can create a section break at the top of the bounding box of vector art. Such a break helps to capture a visual separation that a document creator wanted to convey with vector art, such as a horizontal line. For example, document editor 140 can treat a section break is a paragraph of zero height, but of a width that might span more than one column or section of content portions, or that might span across an entire page. For content portions of vector art, or raster art, within document 250 that do not overlap other content portions, document editor 140 can treat such images as a content portion that needs to be sorted, instead of as a section break.

Bounding box P-6 is below bounding box P-5 and so node P-6 is positioned accordingly in the presentation order tree 454. The same analysis applies for bounding box P-7 to place node P-7. Bounding box P-8 is below bounding box P-5, but to the right of bounding box P-7, and so node P-8 is placed as the right branch of node P-7. Bounding box P-9 appears below bounding box P-7, and so node P-9 becomes the down branch of node P-7. Bounding box P-10 appears below bounding box P-7, but to the right of bounding box P-9, and so node P-10 becomes the right node of P-9. Bounding box P-11 appears to the right of bounding box P-7, and below bounding box P-8 and so node P-11 becomes the down branch of node P-8.

Note that bounding boxes may not align perfectly with adjacent boxes. It may be the case that bounding boxes P-9, P-13, and P-16 have slightly different widths. There are several potential reasons for differing widths. One reason is that text within associated paragraphs is left aligned instead of justified. In these situations, document editor 140 uses tolerances to identify when a content portion extends above or below multiple content portions.

Document editor 140 sequentially processes bounding boxes P-12 through P-22 following the same pattern of logic, as described above, to result in placement of nodes P-12 through P-22 as shown in FIG. 4.

Bounding box P-23 causes a different operation. Evaluating relative graphical position of bounding box P-23, document editor 140 identifies that bounding box P-23 horizontally spans underneath both boxes P-9 and P-10. Because of the extension of bounding box P-23, when document editor 140 evaluates node P-23 at node P-9, document editor 140 inserts a branch closure 424 on the down branch of node P-9. This means document editor 140 can no longer insert subsequent nodes in the down branch of node P-9. Any subsequent bounding box that document editor 140 evaluates at node P-9, automatically passes to node P-10 to complete evaluation and node placement.

Bounding box P-24 is next for evaluation. Bounding box P-24 graphically appears below bounding box P-9. In other words, bounding boxes P-9 and P-24 are in a first column of bounding boxes. Nevertheless, because of closure 424, node P-24 moves along the down branch of P-10 and is positioned as the down branch of P-23. Bounding box P-25 follows this pattern of logic to become node P-25, which is the right branch of node P-24.

Document editor 140 sequentially processes bounding boxes P-26 through P-34 following the same pattern of logic to result in node placement as shown in FIG. 4 which comprises a presentation order 454 or a read order.

Document editor 140 extracts a presentation order of nodes 453 by executing an inorder traversal of the presentation order tree 454. For the example tree in FIG. 4, document editor 140 begins at the root node P-1, and then follows each branch by first by attempting to follow a down branch, and then a right branch. Note that during inorder traversal of the presentation order tree 454, to produce the presentation order of nodes, document editor 140 can ignore down-branch closures 421, 422, 423, and 424.

As a result, for the example tree in FIG. 4, the inorder traversal is: P-1, P-2, P-3, P-4, P-5, P-6, P-7, P-9, P-13, P-16, P-20, P-10, P-12, P-14, P-17, P-21, P-23, P-24, P-27, P-31, P-25, P-28, P-33, P-8, P-11, P-15, P-18, P-19, P-22, P-26, P-29, P-30, P-32, P-34.

Figure 6:
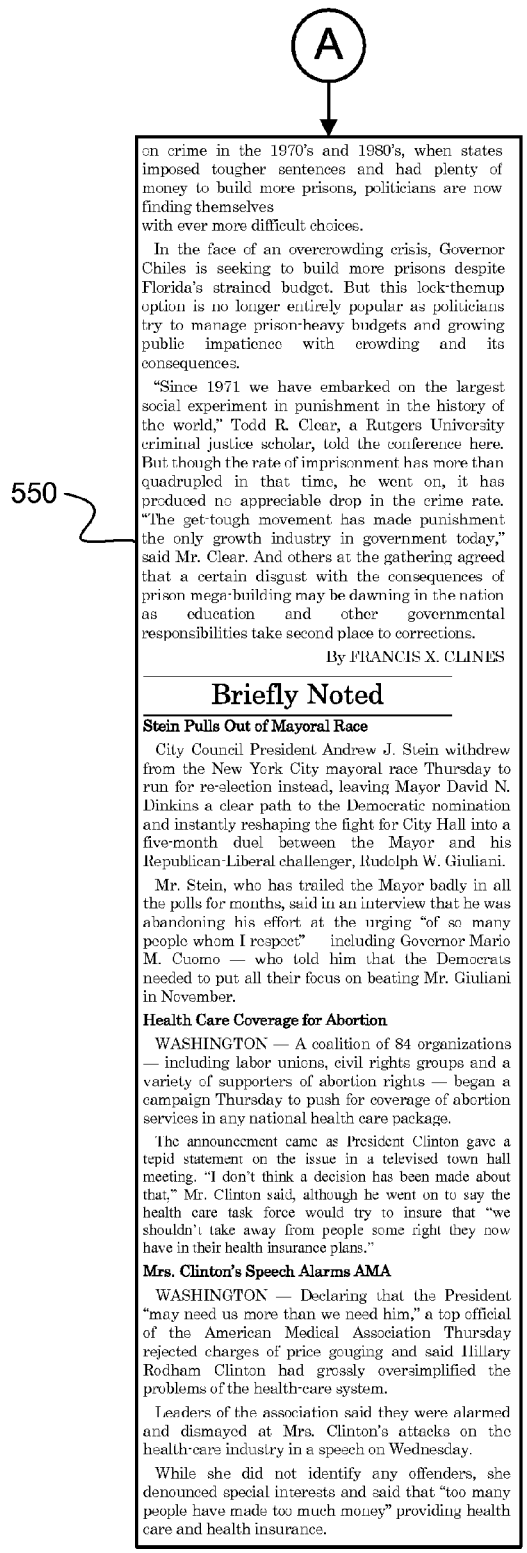

Document editor 140 then provides the presentation order of the content portions. FIGS. 5 and 6 show a representation of an example document 510 (extending to FIG. 6) that is a second layout for reordered content portions. Display device 535 illustrates how content portions 557 can be presented or reflowed to readably fit on a small screen.

The second layout could be a different PDF document. For example, if the original document were 8.5 by 11 inches in size, the second layout might be a PDF that is 2 inches wide by 46 inches long. Alternatively, documented editor 140 generates HTML or other structural information for presenting the content portions. Alternatively, document editor 140 uses a combination of HTML and drawing commands for presenting the content in a second layout. Alternatively, document editor 140 simply presents a modified display list, or an original display list in conjunction with a list of associated transforms, without retaining any syntax associated with any specific file format.

Examples in the detailed description relate to Western text having a horizontal writing system. The document editor is not limited to text or Western writing systems. The same document editing process applies to vertical writing systems such as Chinese and Japanese. In the case of vertical text, that is text which is read top-to-bottom within lines and right-to-left between lines, document editor 140 can, for example, rotate the source page 90° counterclockwise and then process document contents by treating the document contents as if the document contents were horizontal text (reading left-to-right within lines, and top-to-bottom between lines). In other words, the document editing process is applicable to multiple text and image orientations.

Figure 7:
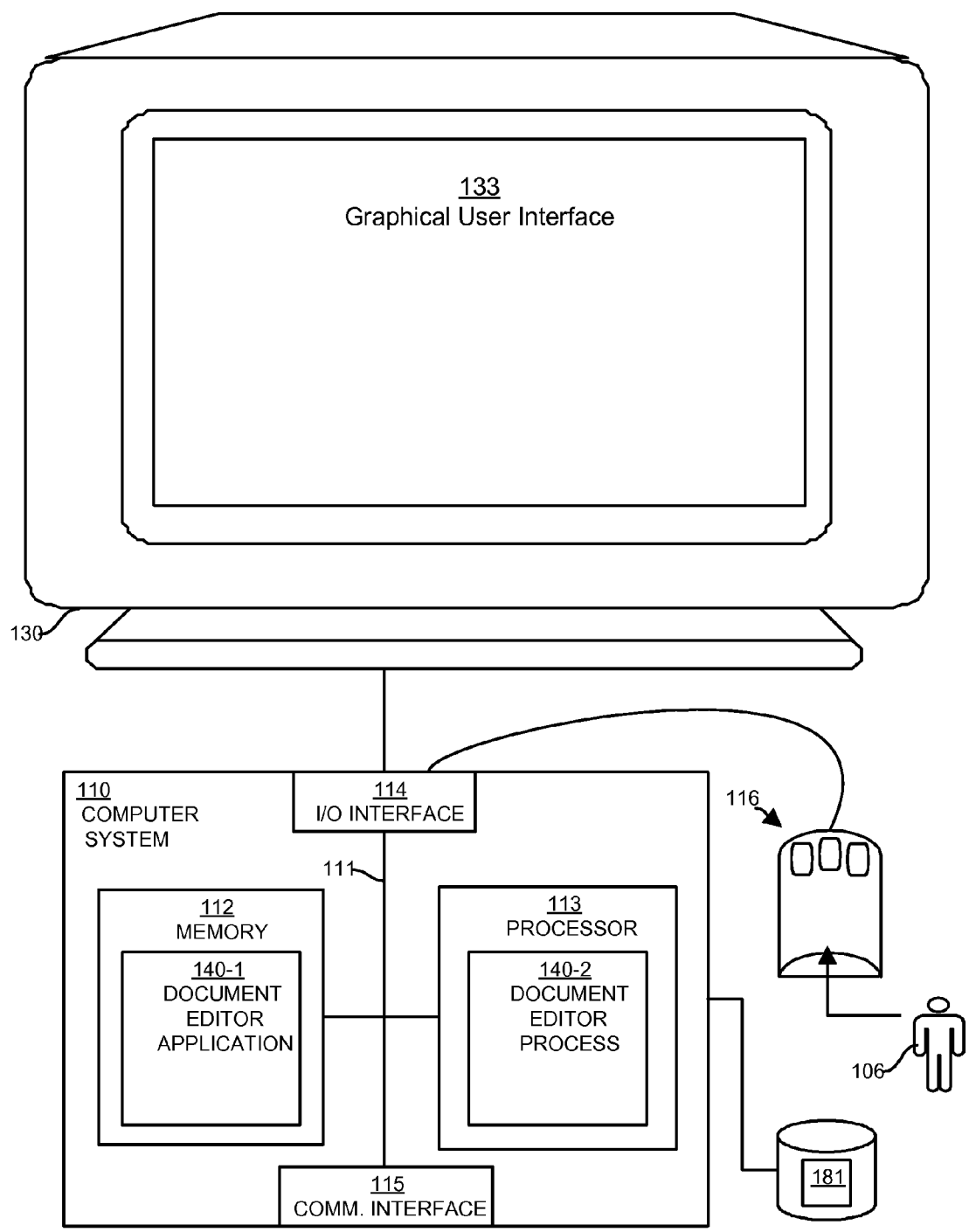
FIG. 7 is a block diagram illustrating an example architecture of a computer system in a computer/network environment according to embodiments herein.

FIG. 7 is a block diagram of an example architecture of a respective computer system 110 such as one or more computers, processes, etc., for implementing a document editor 140 according to embodiments herein. Computer system 110 can include one or more computer devices such as personal computers, servers that make up a website, workstations, portable computing devices, consoles, network terminals, networks, processing devices, etc.

In FIG. 7, computer system 110 is shown connected to display monitor 130 for displaying a graphical user interface 133 for a user 106 to select and view documents, using input devices 116 and to view edited content. Repository 181 can optionally be used for storing documents and content both before and after processing. Input devices 116 can include one or more devices such as a keyboard, computer mouse, etc.

Note that the following discussion provides a basic embodiment indicating how to carry out functionality associated with the document editor 140 as discussed above and below. However, it should be noted that the actual configuration for carrying out the document editor 140 can vary depending on a respective application. For example, as previously discussed, computer system 110 can include one or multiple computers that carry out the processing as described herein.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the document editor 140 of computer system 110 to communicate over a network and, if necessary, retrieve any data required to create views, process content, communicate with a user, etc. according to embodiments herein.

As shown, memory system 112 is encoded with document editor application 140-1 that supports functionality as discussed above and as discussed further below. Document editor application 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the document editor application 140-1. Execution of the document editor application 140-1 produces processing functionality in document editor process 140-2. In other words, the document editor process 140-2 represents one or more portions of the document editor 140 performing within or upon the processor 113 in the computer system 110.

It should be noted that, in addition to the document editor process 140-2 that carries out method operations as discussed herein, other embodiments herein include the document editor application 140-1 itself (i.e., the un-executed or non-performing logic instructions and/or data). The document editor application 140-1 may be stored on a tangible computer readable storage medium or any other computer readable media such as floppy disk, hard disk, optical medium, etc. According to other embodiments, the document editor application 140-1 can also be stored in a memory type system such as in firmware, read only memory (ROM), or, as in this example, as executable code within the memory system 1012.

In addition to these embodiments, it should also be noted that other embodiments herein include the execution of the document editor application 140-1 in processor 113 as the document editor process 140-2. Thus, those skilled in the art will understand that the computer system 110 can include other processes and/or software and hardware components, such as an operating system that controls allocation and use of hardware resources, or multiple processors.

Functionality supported by computer system 110 and, more particularly, functionality associated with document editor 140 will now be discussed via flowcharts in FIG. 8 through FIG. 10. For purposes of the following discussion, the document editor 140 or other appropriate entity performs steps in the flowcharts.

Figure 8:
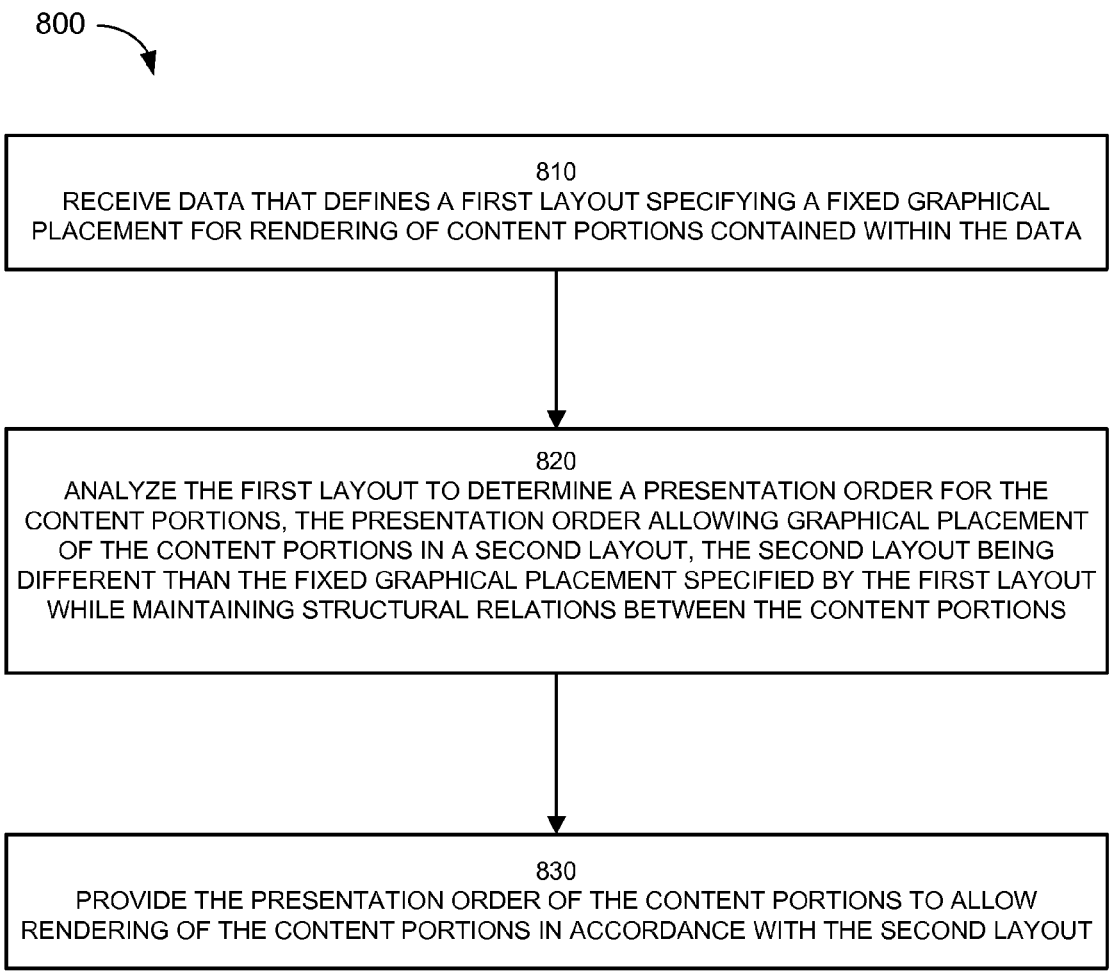
FIG. 8 is a flowchart illustrating an example of a process supporting document processing according to embodiments herein.

More particularly, FIG. 8 is an example flowchart 800 illustrating operations associated with document editor 140 according to embodiments herein. Note that flowchart 800 of FIG. 8 and corresponding text below may overlap with, refer to, and expand on some of the matter previously discussed with respect to FIGS. 1-7. Also, note that the steps in the below flowcharts need not always be executed in the order shown.

In step 810, document editor 140 receives data, such as from document 150, that defines a first layout. Document editor 140 can receive the data from any of many data sources such as a file system, document, database, etc. The first layout specifies a fixed graphical placement for rendering of content portions 153 contained within the data. In the first layout, certain content portions may have structural relations between other content portions. As an example, in a newspaper story comprising paragraphs of text that span more than one column, if a column of a paragraphs of text warps from a first column to a second column, the lower most paragraph (or portion thereof) in the first column that terminates at the end of the first column (i.e. a first content portion) has a structural relation to the paragraph that begins or starts at the top of the next column (i.e. the next or remainder of the former paragraph). The structural relation in this example is that a reader of these content portions would read the lower paragraph of the first column and then proceed to read the upper paragraph of the next column where the newspaper article continues.

In step 820, document editor analyzes the first layout to determine the presentation order for the content portions. The presentation order allows graphical placement of the content portions in a second layout that is different than the fixed graphical placement specified by the first layout and that maintains structural relations between the content portions as expressed in the first layout. Using the example above of paragraphs of text in a multi-column format, there are some newspaper paragraphs that span two columns in that such paragraphs reach an end of a first column, are split, and then continue in a second or adjacent column. Such a split paragraph becomes two separate content portions, which must be connected in a presentation order/read order for correct or logical presentation and recreation of structural relationships. In step 820 the document editor can analyze the first layout and identify content portions and their structural relations and can produce a presentation order for these content portions that allows reformatting of the content portions for a different screen or display device size, but allows the content portions to be presented in an order or sequence that maintains their structural read-order. Thus the presentation order allows reproduction of the content portions in a different (i.e. second) layout that can be reflowed for a different screen size, but that keeps the structural relations of content portions that was detected during analysis of the first layout.

In step 830, document editor 140 provides the presentation order of the content portions 153 to allow rendering of the content portions in accordance with the second layout.

Figure 9:
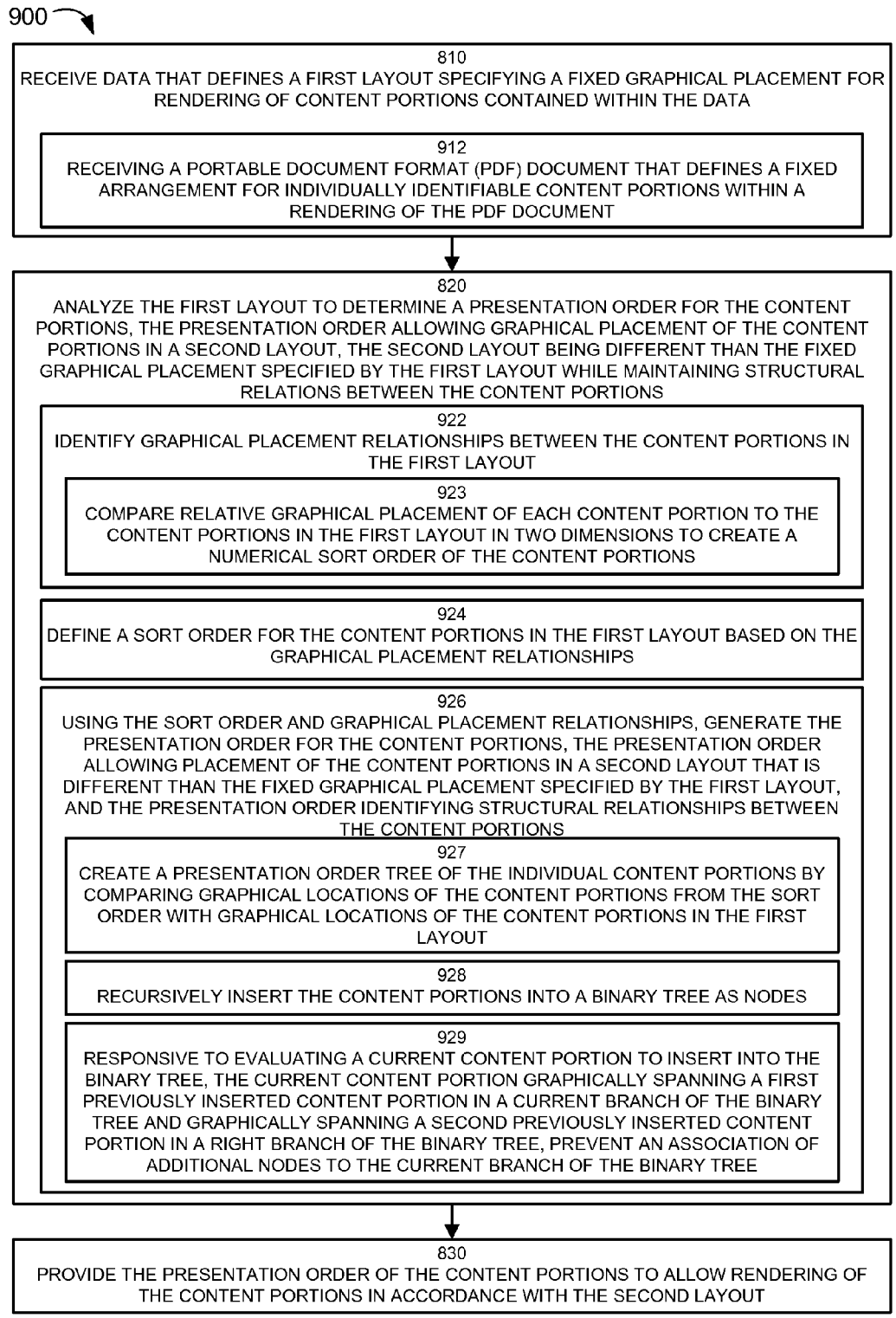
FIG. 9 is a flowchart illustrating an example of a process supporting document processing according to embodiments herein.

FIG. 9 is an example flowchart 900 that expands on flowchart 800 by illustrating details of operations associated with a document editor according to embodiments herein.

In step 810, document editor 140 receives data, such as data from the document 150, that defines a first layout. The first layout specifies a fixed graphical placement for presentation or rendering of content portions 153 contained within document 150.

In step 912, document editor 140 receives a portable document format (PDF) document 150 that defines a fixed arrangement for individually identifiable content portions contained within a rendering of the PDF document. In other words, there are content portions that document editor 140 can identify and group as individual or independently identifiable parts of the PDF document.

In step 820, document editor 140 analyzes the first layout to determine the presentation order for the content portions. Details of this processing will be provided in reference to FIG. 10. Generally, however, the presentation order allows graphical placement of the content portions in a second layout that is different than the fixed placement specified by the first layout, but that maintains the structural relations between content portions in the first layout. In step 922, document editor 140 identifies graphical placement relationships between content portions 153 in the first layout. For example, document editor 140 identifies graphical coordinates of regions that content portions 153 occupy in document 150. As an example, the graphical coordinates of regions that content portions occupy may correspond to the bounding boxes around paragraphs P-1 through P-34 as shown in FIG. 3. In step 923, document editor 140 compares graphical and relative placement of each content portion to the content portions 153 in the first layout in two dimensions (e.g. horizontal and vertical on a given page) to create a numerical sort order of the content portions 153. For example, the two dimensions can correspond to an X-axis and a Y-axis.

In step 924, document editor 140 defines a sort order of the content portions 153 in the first layout based on the graphical placement relationships. Alternatively, document editor 140 identifies a sort order for the content portions in the first layout based on dimensions of each content portion and relative graphical locations of the content portions. The example code segment above indicates a mechanism to determine a sort order for content portions in a given first layout.

In step 926, using the sort order 152 and graphical placement relationships of content portions, document editor 140 generates the presentation order 454 of the content portions 153. The presentation order 454 allows placement of the content portions in a second layout that is different than the fixed placement specified by the first layout. Presentation order 454 identifies structural relationships between content portions 153.

In step 927, document editor 140 creates a presentation order tree of the individual content portions by sequentially comparing graphical locations of numbered content portions, from the sort order 152, with graphical locations of the content portions in the first layout, or based on relative graphical placement in the first layout. In step 928, document editor 140 recursively inserts content portions into a binary tree as nodes.

In step 929, responsive to evaluating a current content portion to insert into the binary tree, the current content portion graphically spanning a first previously inserted content portion in a current branch of the binary tree and graphically spanning a second previously inserted content portion in a right branch of the binary tree, document editor 140 prevents the association of additional nodes to the current branch of the binary tree. In other words, document editor 140 closes the current branch of the binary tree to receiving additional nodes.

Document editor 140 can add structural information to the content portions. Such structural information enables content to be reflowed in subsequent renderings. For example, the structural information allows document contents to be wrapped or expanded to fit a given viewing area similar to how HTML content is reflowable.

In step 830, document editor 140 provides the presentation order of the content portions 153 to allow rendering of the content portion in accordance with the second layout. This can be a second document or a stream of information, or the like that provides or renders the content portions structurally, but in a different layout (i.e. graphically arranged differently) than they existed in the first layout. Document editor 140 can produce a presentation order for the content portions that allows presentation of the content portions in graphical manner that is different than the first layout, but that maintains the structural relationships between those content portions. Document editor 140 can create a presentation order tree of the individual content portions by iterating over the sort order, and executing an inorder traversal of the presentation order tree.

Document editor 140 can produce a presentation order for the individual content portions of a PDF document. Such a presentation order includes a read order of the individual content portions, and allows presentation of the content portions in the read order on a display device having a size that would not allow full readability of the content portions in the presentation format defined by the PDF document on the display device. By way of a non-limiting example, a mobile phone having a screen size of just a few square inches, does not allow full readability of content portions of a PDF document having an A4 document size.

Figure 10:
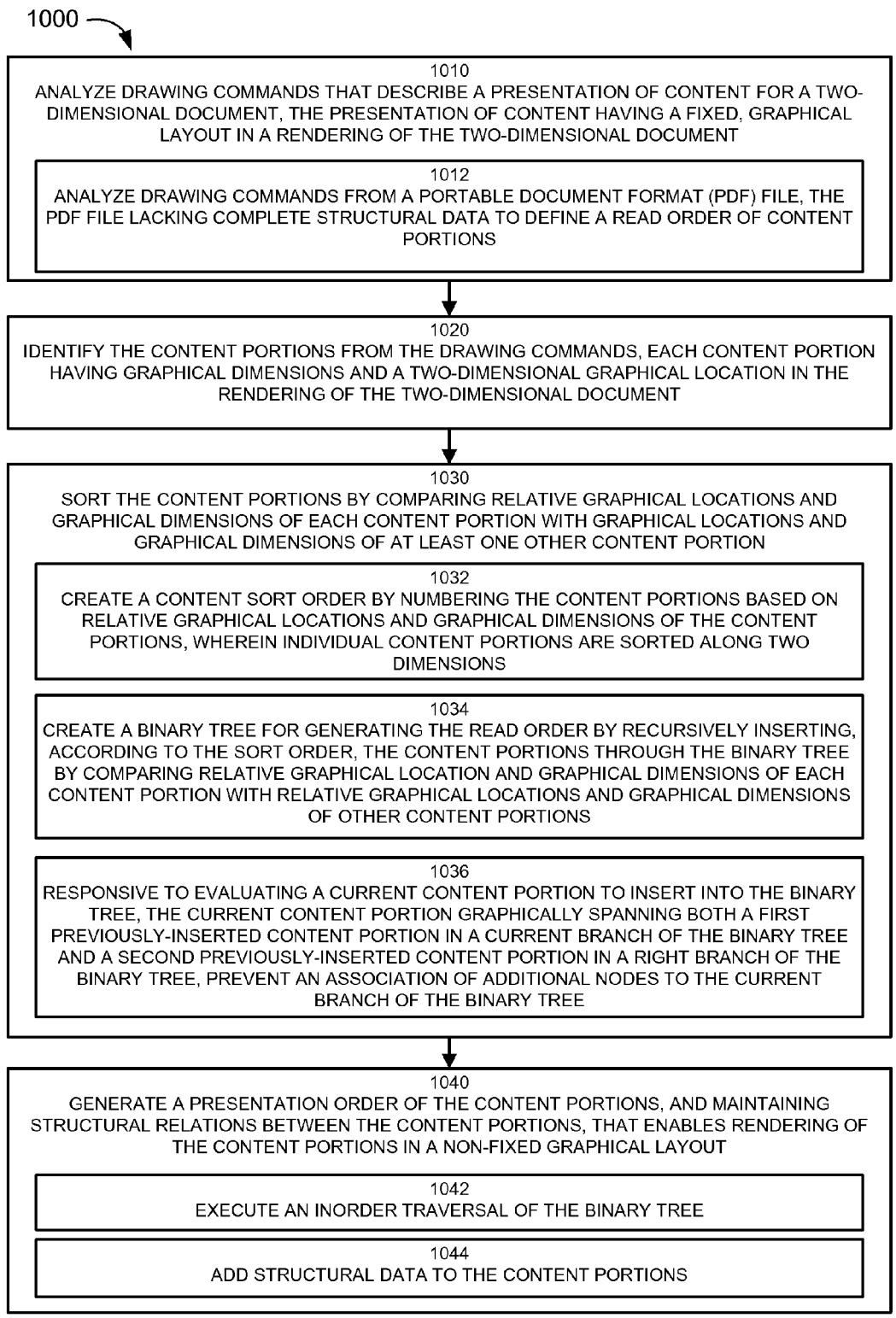
FIG. 10 is a flowchart illustrating an example of a process supporting document processing according to embodiments herein.

FIG. 10 is an example flowchart 1000 illustrating operations associated with document editor 140 according to embodiments herein to perform analysis of content portions for production of the presentation order.

In step 1010, document editor 140 analyzes drawing commands that describe a presentation of content for a two-dimensional document 150. The presentation of content having a fixed, graphical layout in a rendering of the two-dimensional document. In step 1012, document editor 140 analyzes drawing commands from a portable document format (PDF) file. The PDF lacks complete structural data to define a read order of the content portions. The drawing commands, for example, can be contents of a display list in a PDF file.

In step 1020, document editor 140 identifies content portions from the drawing commands (i.e., that define the first layout and content portions of the document). Each content portion has graphical dimensions and a two-dimensional graphical location in the document 150 (if that content portion were rendered).

In step 1030, document editor 140 sorts the content portions 153 by comparing relative graphical locations and graphical dimensions of the content portions 153 with graphical locations and graphical dimensions of at least one other content portion 153 (again as if they were rendered).

In step 1032, document editor 140 creates a content sort order by numbering the content portions 153 based on relative graphical locations. The document editor 140 sorts individual content portions along two-dimensions (e.g. horizontally and vertically).

In step 1034, document editor 140 creates a binary tree for generating the read order by recursively inserting, according to the sort order 152, the content portions 153 through the binary tree 454 by comparing relative graphical location and graphical dimensions of each content portion with relative graphical locations and graphical dimensions of other content portions.

In step 1036, responsive to evaluating a current content portion to insert into the binary tree, the current content portion graphically spanning both a first previously-inserted content portion in a current branch of the binary tree and a second previously-inserted content portion in a right branch of the binary tree, document editor 140 prevents the association of additional nodes to the current branch of the binary tree. For example, inserting branch closure 424 on the down branch of node P-9.

In step 1040, document editor 140 generates a presentation order of the content portions. In step 1042, document editor 140 executes an inorder traversal of the binary tree. In step 1044, document editor 140 adds structural data to the content portions. This enables creation of a re-flowable presentation order.

In this manner, during steps 1032 through 1034, each content portion that has been individually identified and assigned a value in the sort order is then inserted into the binary tree to produce a read order tree. Once all content portions in the sort order have been inserted into the read order tree, an inorder traversal of this read order tree produces the presentation order of the content portions that will maintain the structural relations between the content portions as expressed in the first layout. Using this presentation order, the system can render a second layout of the content portions in any way that is desired so long as the presentation order is maintained. By maintaining presentation order (i.e. by presenting the content portions according to the inorder traversal of the read order tree), structural relations are maintained in the second layout between content portions. This allows the second layout to make sense to a person reading or viewing the document in the second layout. The second layout may be, as discussed above, a linear single column list of paragraphs, and each content portion will be presented in proper structural order. Using the multi-column newspaper example above, the presentation order presents paragraphs of text in sequence that maintains readability of the various articles of the stories on the page, thus allowing the multi-column fixed format of the first layout to be reflowed into, for example, a single column presentation of paragraphs that may be better for viewing on a small display screen such as that of a PDA or cell phone device.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
   receiving data that defines a first layout specifying a fixed graphical placement for rendering of graphical content portions contained within the data;
   identifying graphical placement relationships between the graphical content portions in the first layout, and defining a sort order for the graphical content portions in the first layout based on the graphical placement relationships;
   generating an ordered tree structure for the graphical content portions based on the sort order, the ordered tree structure comprising a plurality of nodes, each node identifying one of the graphical content portions, the plurality of nodes arranged in the ordered tree structure such that an in-order traversal of each node of the ordered tree structure maintains a presentation order of the graphical content portions in the first layout, the ordered tree structure allowing graphical placement of the graphical content portions in a second layout in accordance with the presentation order based on the in-order traversal of each node of the ordered tree structure, the second layout different than the first layout; and providing the ordered tree structure to allow rendering of the graphical content portions in accordance with the second layout.

2. The method of claim 1, wherein identifying graphical placement relationships comprises:
 comparing relative graphical placement of each graphical content portion to the graphical content portions in the first layout in two dimensions to create a numerical sort order of the graphical content portions.

3. The method of claim 2, wherein identifying graphical placement relationships includes:
 identifying graphical dimensions of the graphical content portions, and
 identifying graphical placement of the graphical content portions relative to the two dimensions.

4. The method of claim 1 further comprising analyzing the first layout, wherein analyzing the first layout comprises:
 analyzing graphical placement of the graphical content portions within the first layout of the data to determine structural relationships between the graphical content portions; and
 producing a presentation order based on the ordered tree structure for the graphical content portions that allows presentation of the graphical content portions in a graphical manner that is different than the first layout, and that maintains the structural relationships between those graphical content portions.

5. The method of claim 1, wherein the ordered tree structure comprises a binary tree, and wherein generating the ordered tree structure for the graphical content portions comprises:
 comparing graphical locations of the graphical content portions from the sort order with graphical locations of the graphical content portions in the first layout;
 recursively inserting the graphical content portions into the binary tree as nodes; and
 responsive to evaluating a current graphical content portion to insert into the binary tree, the current graphical content portion graphically spanning a first previously inserted graphical content portion in a current branch of the binary tree and graphically spanning a second previously inserted graphical content portion in a right branch of the binary tree, preventing an association of additional nodes to the current branch of the binary tree.

6. The method of claim 5, further comprising generating a presentation order for the graphical content portions by iterating over the sort order, and executing an in-order traversal of the ordered tree structure.

7. The method of claim 5, wherein generating the ordered tree structure for the graphical content portions comprises:
 identifying that a bounding box for a graphical content portion comprising vector art graphically overlaps a bounding box comprising text; and
 creating a section break at the graphical content portion comprising vector art.

8. The method of claim 1, wherein providing the ordered tree structure of the graphical content portions includes:
 adding structural information to the graphical content portions.

9. The method of claim 1 wherein receiving the data that defines the first layout comprises:
 receiving a portable document format (PDF) document that defines a fixed arrangement for individually identifiable graphical content portions within a rendering of the PDF document;
 and wherein generating the ordered tree structure comprises:
 identifying a graphical placement relation of the graphical content portions, in the PDF document, in relation to at least one other graphical content portion in the PDF document; and
 producing the presentation order for the individual graphical content portions of the PDF document, the presentation order having a read order of the individual graphical content portions, and allowing presentation of the graphical content portions in the read order on a display device having a size that would not allow full readability of the graphical content portions in the presentation format defined by the PDF document on the display device.

10. A method comprising:
 analyzing drawing commands that describe a presentation of content for a two-dimensional document, the presentation of content having a fixed, graphical layout in a rendering of the two-dimensional document;
 identifying graphical content portions from the drawing commands, each graphical content portion having graphical dimensions and a two-dimensional graphical location in the rendering of the two-dimensional document;
 sorting the graphical content portions to generate a sort order by comparing relative graphical locations and graphical dimensions of each graphical content portion with graphical locations and graphical dimensions of at least one other graphical content portion; and
 generating an ordered tree structure of the graphical content portions based on the sort order, the ordered tree structure comprising a plurality of nodes, each node identifying one of the graphical content portions, the plurality of nodes arranged in the ordered tree structure such that an in-order traversal of each node of the ordered tree structure maintains the presentation order between the graphical content portions, that enables rendering of the graphical content portions in a non-fixed graphical layout in accordance with the presentation order based on the in-order traversal of each node of the ordered tree structure.

11. The method of claim 10, wherein generating the ordered tree structure of the graphical content portions includes:
 adding structural data to the graphical content portions.

12. The method of claim 11, wherein analyzing the drawing commands includes:
 analyzing drawing commands from a portable document format (PDF) file, the PDF file lacking complete structural data to define a read order of the graphical content portions.

13. The method of claim 10, wherein sorting the graphical content portions comprises creating a content sort order by numbering the content portions based on relative graphical locations and graphical dimensions of the graphical content portions, wherein individual graphical content portions are sorted along two dimensions;
 wherein generating the ordered tree structure comprises:

creating a binary tree for generating a read order by recursively inserting, according to the sort order, the graphical content portions into the binary tree by comparing relative graphical location and graphical dimensions of each graphical content portion with relative graphical locations and graphical dimensions of other graphical content portions; and responsive to evaluating a current graphical content portion to insert into the binary tree, the current graphical content portion graphically spanning both a first previously-inserted graphical content portion in a current branch of the binary tree and a second previously-inserted graphical content portion in a right branch of the binary tree, preventing an association of additional nodes to the current branch of the binary tree; and further comprising generating the presentation order of the graphical content portions includes executing an in-order traversal of the binary tree.

14. A non-transitory computer program product including a computer-storage medium having instructions stored thereon for processing data information, such that the instructions, when carried out by a processing device, enable the processing device to perform the operations of:

receiving data that defines a first layout specifying a fixed graphical placement for rendering of graphical content portions contained within the data;

identifying graphical placement relationships between the graphical content portions in the first layout, and defining a sort order for the graphical content portions in the first layout based on the graphical placement relationships;

generating an ordered tree structure for the graphical content portions, the ordered tree structure comprising a plurality of nodes, each node identifying one of the graphical content portions, the plurality of nodes arranged in the ordered tree structure such that an in-order traversal of each node of the ordered tree structure maintains a presentation order of the graphical content portions in the first layout, the ordered tree structure allowing graphical placement of the graphical content portions in a second layout in accordance with the presentation order based on the in-order traversal of each node of the ordered tree structure, the second layout different than the first layout; and providing ordered tree structure to allow rendering of the graphical content portions in accordance with the second layout.

15. The non-transitory computer program product as in claim 14, wherein identifying placement relationships comprises:

comparing relative graphical placement of each graphical content portion to the graphical content portions in the first layout in two dimensions to create a numerical sort order of the graphical content portions.

16. The non-transitory computer program product as in claim 15, wherein identifying placement relationships includes:

identifying graphical dimensions of the graphical content portions, and identifying graphical placement of the graphical content portions relative to the two dimensions.

17. The non-transitory computer program product as in claim 14, further comprising analyzing the first layout, wherein analyzing the first layout comprises:

analyzing graphical placement of the graphical content portions within the first layout of the data to determine structural relationships between the graphical content portions; and producing a presentation order based on the ordered tree structure for the graphical content portions that allows presentation of the graphical content portions in a graphical manner that is different than the first layout, and that maintains the structural relationships between those graphical content portions.

18. The non-transitory computer program product as in claim 14, further comprising analyzing the first layout, wherein analyzing the first layout to determine a presentation order comprises:

identifying a sort order for the graphical content portions in the first layout based on dimensions of each graphical content portions and relative graphical locations of the graphical content portions; and wherein the generating the ordered tree structure for the graphical content portions is based on the sort order and based on relative graphical placement of the graphical content portions in the first layout.

19. The non-transitory computer program product as in claim 18, wherein generating a presentation order for the graphical content portions comprises:

creating the ordered tree structure of the individual graphical content portions by sequentially comparing graphical locations of the graphical content portions from the sort order with graphical locations of the graphical content portions in the first layout.

20. The non-transitory computer program product as in claim 19, further comprising generating a presentation order for the graphical content portions by iterating over the sort order, and executing an in-order traversal of the ordered tree structure.

21. The non-transitory computer program product as in claim 19, wherein generating the ordered tree structure for the graphical content portions comprises:

identifying that a bounding box for a graphical content portion comprising vector art graphically overlaps a bounding box comprising text; and creating a section break at the graphical content portion comprising vector art.

22. The non-transitory computer program product as in claim 18, wherein providing the ordered tree structure of the graphical content portions includes:

adding structural information to the graphical content portions to create re-flowable content.

23. The non-transitory computer program product as in claim 14, wherein receiving the data that defines the first layout comprises:

receiving a portable document format (PDF) document that defines a fixed arrangement for individually identifiable graphical content portions within a rendering of the PDF document;

and wherein generating the ordered tree structure for the graphical content portions comprises:

identifying a graphical placement relation of the graphical content portions, in the PDF document, in relation to at least one other graphical content portion in the PDF document; and producing a presentation order for the individual graphical content portions of the PDF document, the presentation order having a read order of the individual graphical content portions, and allowing presentation of the graphical content portions in the read order on a display device having a size that would not allow full readability of the graphical content portions in the presentation format defined by the PDF document on the display device.

24. A computer system comprising:
a processor;
a memory unit that stores instructions associated with an application executed by the processor; and
an interconnect coupling the processor and the memory unit, enabling the computer system to execute the application and perform operations of:
 receiving data that defines a first layout specifying a fixed graphical placement for rendering of graphical content portions contained within the data;
 identifying graphical placement relationships between the graphical content portions in the first layout, and defining a sort order for the graphical content portions in the first layout based on the graphical placement relationships;
 generating an ordered tree structure for the graphical content portions, the ordered tree structure comprising a plurality of nodes associated with the graphical content portions, the plurality of nodes arranged in the ordered tree structure such that an in-order traversal of each node of the ordered tree structure maintains a presentation order relative spatial positions of the graphical content portions in the first layout, the ordered tree structure allowing graphical placement of the graphical content portions in a second layout in accordance with the presentation order based on the in-order traversal of each node of the ordered tree structure, the second layout different than the first layout; and
 providing the ordered tree structure to allow rendering of the graphical content portions in accordance with the second layout.

25. The non-transitory computer program product of claim 14, wherein the ordered tree structure comprises a binary tree.

* * * * *